United States Patent
Casu et al.

(10) Patent No.: US 11,326,903 B1
(45) Date of Patent: May 10, 2022

(54) ROTARY INDUCTIVE SENSOR

(71) Applicant: Allegro MicroSystems, LLC, Manchester, NH (US)

(72) Inventors: Emanuele Andrea Casu, Annecy (FR); Yannick Vuillermet, Voglans (FR)

(73) Assignee: Allegro MicroSystems, LLC, Manchester, NH (US)

( * ) Notice: Subject to any disclaimer, the term of this patent is extended or adjusted under 35 U.S.C. 154(b) by 0 days.

(21) Appl. No.: 17/097,498

(22) Filed: Nov. 13, 2020

(51) Int. Cl.
*G01D 5/20* (2006.01)
*G01P 3/488* (2006.01)

(52) U.S. Cl.
CPC .............. *G01D 5/204* (2013.01); *G01P 3/488* (2013.01)

(58) Field of Classification Search
CPC . G01D 5/00; G01D 5/20; G01D 5/204; G01P 3/488; G01R 27/267; G01V 3/10; G01V 3/104; G01V 3/105; G01V 3/107; G01V 3/108; G01V 3/28; G01N 27/90; G01N 27/9006; G01N 27/9023
See application file for complete search history.

(56) References Cited

U.S. PATENT DOCUMENTS

| | | |
|---|---|---|
| 4,551,676 A | 11/1985 | Amemiya et al. |
| 4,746,862 A | 5/1988 | Ueki |
| 10,145,908 B2 | 12/2018 | David et al. |
| 10,290,608 B2 | 5/2019 | Latham et al. |
| 10,651,147 B2 | 5/2020 | Latham et al. |
| 10,670,672 B2 | 6/2020 | David et al. |
| 2014/0035564 A1* | 2/2014 | Lee .................. G01D 5/204 324/207.12 |
| 2015/0295525 A1 | 10/2015 | Liu et al. |
| 2019/0360839 A1* | 11/2019 | Shao ................. G01D 5/2006 |
| 2021/0190545 A1* | 6/2021 | Utermoehlen ....... G01D 5/2086 |

OTHER PUBLICATIONS

U.S. Appl. No. 16/547,823 filed Aug. 22, 2019, Briano et al.
U.S. Appl. No. 17/097,533 filed Nov. 13, 2020, Gillet et al.
U.S. Appl. No. 17/082,151 filed Oct. 28, 2020, Drouin.
Renesas Datasheet IPS2200 "Inductive Position Sensor IC"; Jul. 15, 2020; 21 pages.
Office Action dated Jan. 31, 2022 for U.S. Appl. No. 17/097,533; 14 pages.

* cited by examiner

*Primary Examiner* — Son T Le
(74) *Attorney, Agent, or Firm* — Daly, Crowley, Mofford & Durkee, LLP

(57) ABSTRACT

An apparatus, comprising: a transmitting coil; a first receiving coil having a first receiving coil portion and a second receiving coil portion, the first receiving coil portion and the second receiving coil portion being coupled to one another, and the first receiving coil portion and the second receiving coil portion each including N lobes, where N is an integer and N≥1; a second receiving coil having a third receiving coil portion and a fourth receiving coil portion, the third receiving coil portion and the fourth receiving coil portion being coupled to one another, and the third receiving coil portion and the fourth receiving coil portion each including N lobes; wherein the first receiving coil is disposed over the second receiving coil.

16 Claims, 14 Drawing Sheets

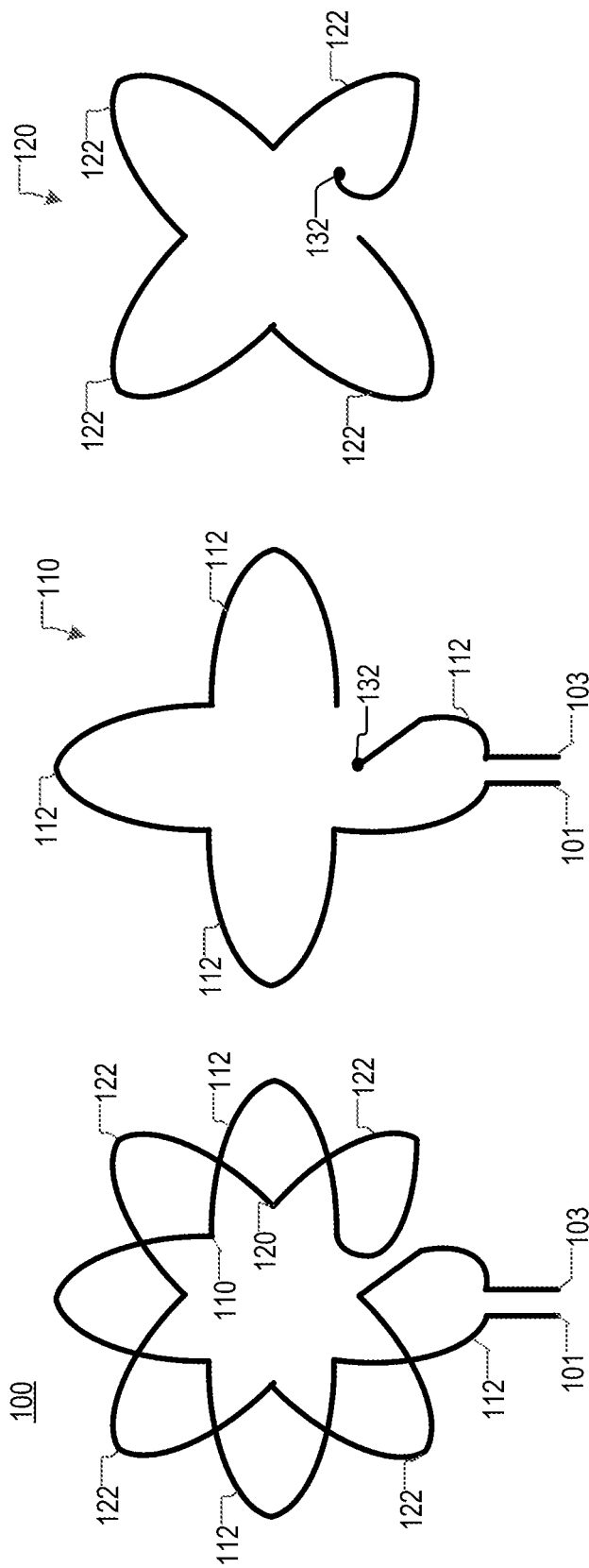

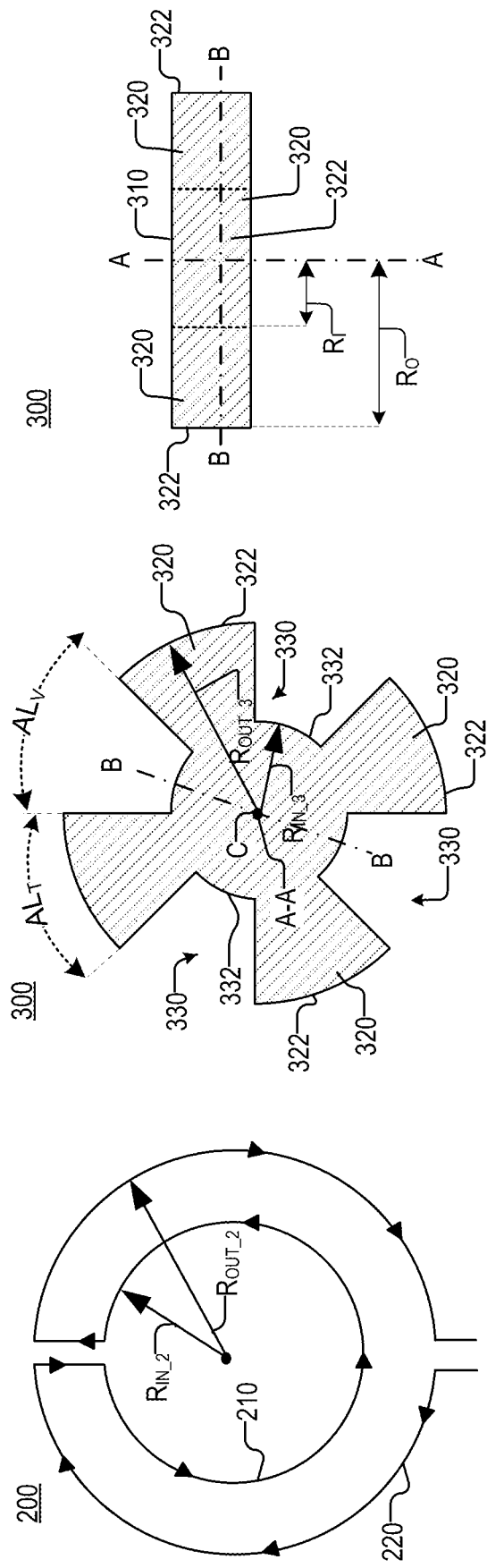

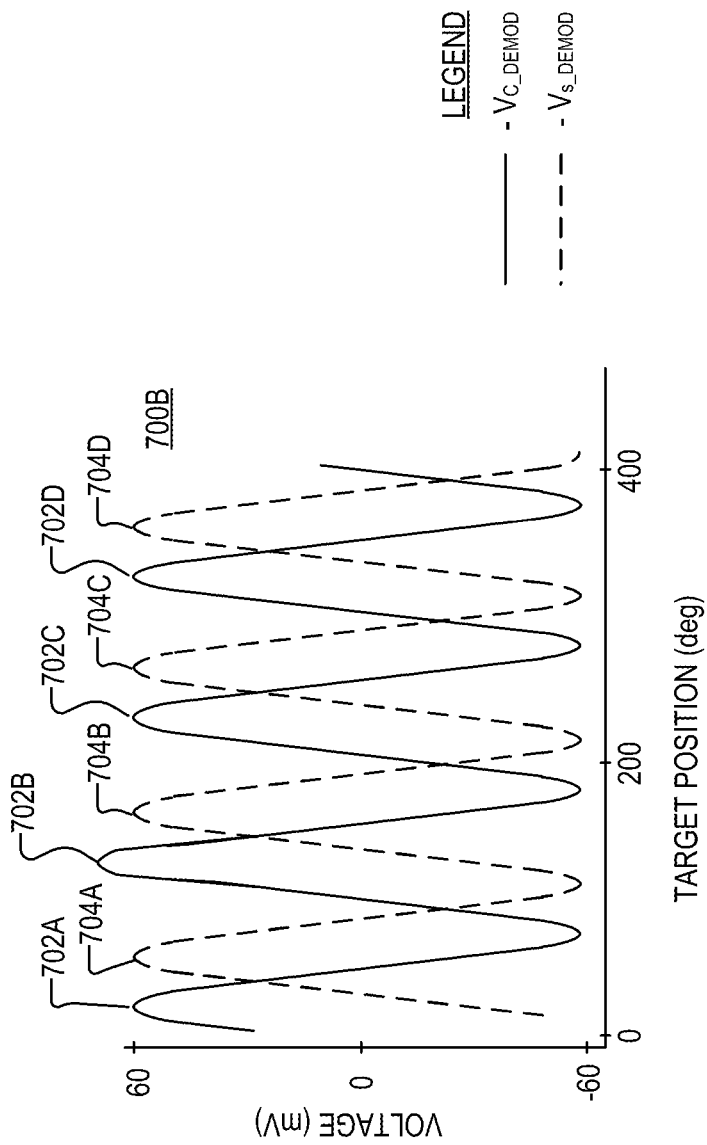

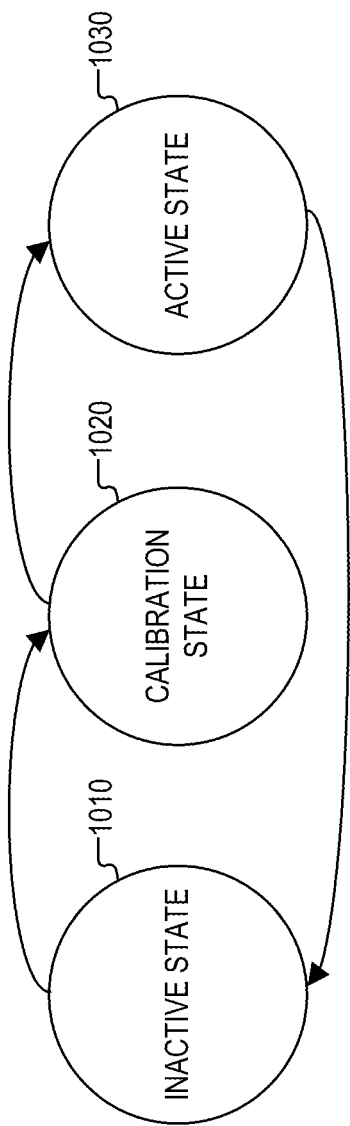

ROTARY INDUCTIVE SENSOR

BACKGROUND

Inductive rotary sensors are a type of position sensor used to detect the position and/or speed, for example, of a rotating target. In particular, inductive rotary sensors can be used to detect the position of a gear or another moving element in a mechanical system. They are frequently used in automated control applications, such as automated control applications in automobiles or industrial equipment, for example.

SUMMARY

According to aspects of the disclosure, an apparatus is provided, comprising: a transmitting coil; a first receiving coil having a first receiving coil portion and a second receiving coil portion, the first receiving coil portion and the second receiving coil portion being coupled to one another, and the first receiving coil portion and the second receiving coil portion each including N lobes, where N is an integer and N≥1; a second receiving coil having a third receiving coil portion and a fourth receiving coil portion, the third receiving coil portion and the fourth receiving coil portion being coupled to one another, and the third receiving coil portion and the fourth receiving coil portion each including N lobes; wherein the first receiving coil is disposed over the second receiving coil, wherein the transmitting coil is disposed over at least one of the first receiving coil and the second receiving coil, and the transmitting coil has an inner radius that is smaller than an outer radius of the first receiving coil; and wherein, the first receiving coil portion and the third receiving coil portion are arranged to conduct electric current in a first direction, and the second receiving coil portion and the fourth receiving coil portion are arranged to conduct electric current in a second direction that is opposite to the first direction.

According to aspects of the disclosure, a system is disclosed comprising: a transmitting coil; a target having N teeth and N valleys, where N is an integer and N≥1; a first receiving coil having a first receiving coil portion and a second receiving coil portion, the first receiving coil portion and the second receiving coil portion being coupled to one another, and the first receiving coil portion and the second receiving coil portion each including N lobes; a second receiving coil that is disposed over the first receiving coil, the second receiving coil having a third coil portion and a fourth coil portion, the third coil portion and the fourth coil portion being coupled to one another, and the third coil portion and the fourth coil portion each including N lobes; and wherein the transmitting coil is arranged to emit a first magnetic field towards the target and the transmitting coil has an inner radius that is smaller than an outer radius of the first receiving coil, wherein the first receiving coil and the second receiving coil are arranged to sense a second magnetic field that is emitted by the target in response to the first magnetic field, wherein the first receiving coil portion has a shape that is at least in part defined by the equation of:

$$R_1(\theta) = R_{in} + \left(\frac{R_{out} - R_{in}}{2}\right)(1 + \cos(N*\theta))$$

where $R_1(\theta)$ is a respective polar coordinate of any point in the first receiving coil portion, $R_{in}$ is an inner radius of the first receiving coil, and $R_{out}$ is the outer radius of the first receiving coil, and wherein the second receiving coil portion has a shape that is at least in part defined by the equation of:

$$R_2(\theta) = R_{in} + \left(\frac{R_{out} - R_{in}}{2}\right)(1 + \cos(N*\theta) + \phi)$$

where $R_2(\theta)$ is a respective polar coordinate of any point in the second receiving coil portion, and $\phi$ is a rotational offset of the first receiving coil portion relative to the second receiving coil portion.

BRIEF DESCRIPTION OF THE DRAWINGS

The foregoing features may be more fully understood from the following description of the drawings in which:

FIG. 1A is a diagram of an example of a receiving coil, according to the example of the disclosure;

FIG. 1B is a diagram of an example of a first coil portion of the receiving coil of FIG. 1A, according to aspects of the disclosure;

FIG. 1C is a diagram of an example of a second coil portion of the receiving coil of FIG. 1A, according to aspects of the disclosure;

FIG. 2 is a diagram of an example of a transmitting coil, according to aspects of the disclosure;

FIG. 3A is a planar top-down view of an example of a target, according to aspects of the disclosure;

FIG. 3B is a planar side view of the target of FIG. 3A, according to aspects of the disclosure;

FIG. 7B is a plot of signals that can be generated by using the sensor of FIG. 6, according to aspects of the disclosure;

FIG. 10 is a state diagram illustrating the operation of the interface circuit of FIG. 8B, according to aspects of the disclosure.

DETAILED DESCRIPTION

Figure 1E:
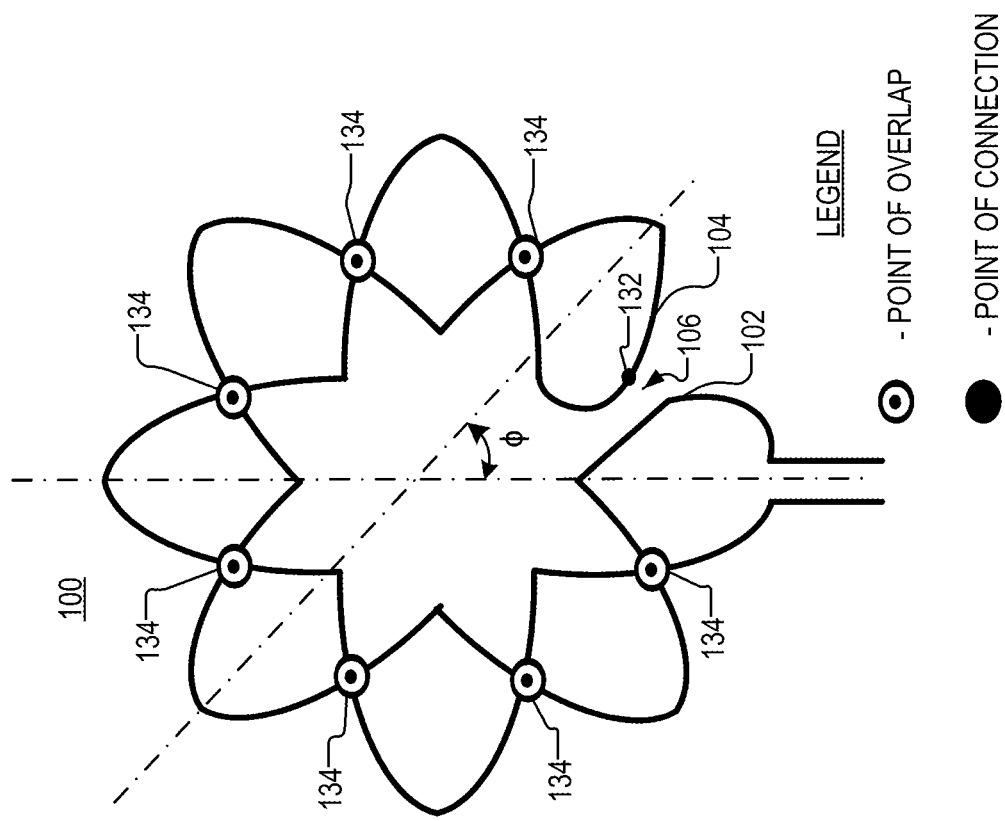
FIG. 1E is a diagram illustrating aspects of the receiving coil of FIG. 1A, according to aspects of the disclosure.

FIGS. 1A-E show an example of a diagram of a receiving coil 100, according to aspects of the disclosure. The receiving coil 100 has a first coil portion 110 and a second coil portion 120 that are centered with one another and rotationally offset from one another (e.g., by 45°). Each of the first coil portion 110 and the second coil portion 120 may include the same number of lobes. According to the example of FIGS. 1A-D, the first coil portion 110 may include four lobes 112 and the second coil portion 120 may also include four lobes 122. However, alternative implementations are possible in which the first coil portion 110, and the second coil portion 120 include a different number of lobes (e.g., see FIGS. 5A-B).

As illustrated in FIG. 1E, the first coil portion 110 may be placed over the second coil portion 120 (or vice versa). The first coil portion 110 may be electrically coupled to the second coil portion 120 at a contact point 132. The first coil portion 110 may overlap with the second coil portion 120 at overlap points 134, however, the first coil portion 110 and the second coil portion 120 may be electrically insulated from one another at overlap points 134. In addition, the coil portion 110 may have connection terminals 101 and 103, and respective ends 102 and 104, which are electrically insulated and/or separated from one another by a gap (e.g., an air gap) 106. In some implementations, the receiving coil 100 may include one turn (e.g., $N_{rx}=1$).

Figure 1D:
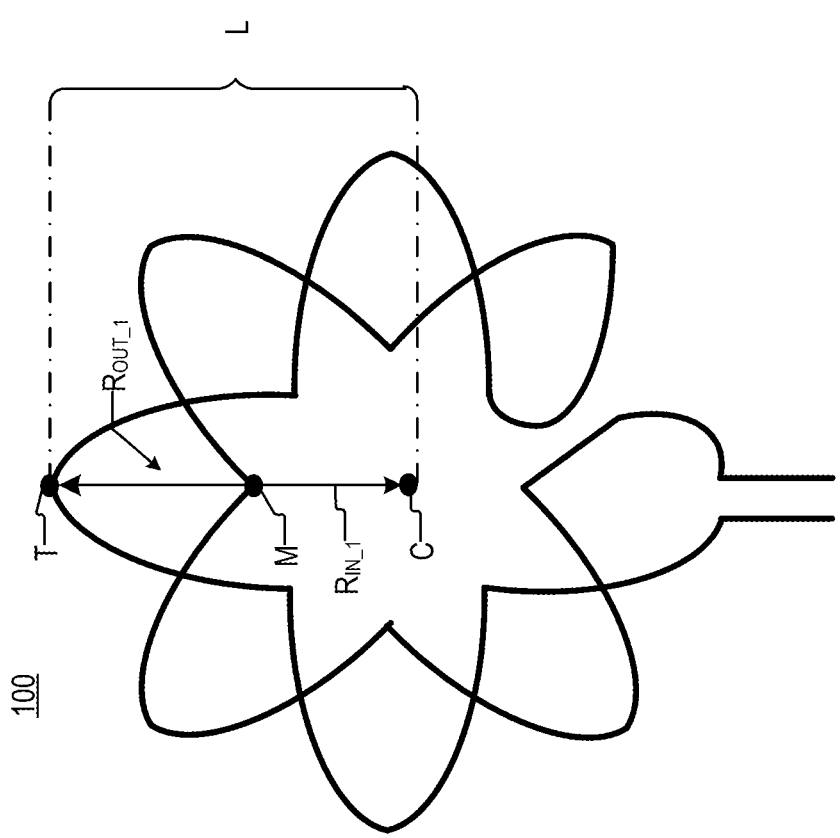
FIG. 1D is a diagram illustrating aspects of the receiving coil of FIG. 1A, according to aspects of the disclosure.

By way of example, in some implementations, such as that shown in FIG. 1D, the shape of the receiving coil 100 may be defined in terms of an inner radius $R_{in\_1}$ and an outer radius $R_{out\_1}$ of the receiving coil 100. The inner radius $R_{in\_1}$ and the outer radius $R_{out\_1}$ may be expressed in terms of a line L, which connects the center C of the receiving coil 100 to any inflection point T that sits at the top of one of the lobes 112 of the first coil portion 110. The line L intersects the second coil portion 120 at a point M, where two adjacent lobes 122 of the coil portion 120 meet. In some implementations, the inner radius $R_{in\_1}$ may be equal to the distance between the center C of the receiving coil 100 and the point M (i.e., the length of line C-M) and the outer radius $R_{out\_1}$ of the receiving coil 100 may be equal to the distance between points C and T (i.e., the length of C-T).

By way of example, in some implementations, the shape of the receiving coil 100 may be represented by Equations 1 and 2 below. More particularly, Equation 1 may define, at least in part, the shape of the first coil portion 110, and Equation 2 may define, at least in part, the shape of the second coil portion 120.

$$R_{110}(\theta) = R_{in_1} + \left(\frac{R_{out_1} - R_{in_1}}{2}\right)(1 + \cos(N*\theta)) \quad (1)$$

$$R_{120}(\theta) = R_{in\_1} + \left(\frac{R_{out_1} - R_{in_1}}{2}\right)(1 + \cos(N*\theta + \phi)) \quad (2)$$

where $R_{110}(\theta)$ is any point on the first coil portion 110, $R_{120}(\theta)$ is any point on the first coil portion 120, N is a constant that is equal to the number of lobes in each of the coil portions 110 and 120, and $\phi$ is the rotational offset between the first coil portion 110 and the second coil portion. According to the present example, the rotational offset $\phi$ may be greater than 0 degrees and less than 360 degrees. In some implementations, the rotational offset $\phi$ of the receiving coil 100 may be equal to half of the period $$\left(\frac{2*\pi}{N}\right)$$

of the first and second coil portions. According to the present example, N (i.e., the number of lobes) is equal to four (4). However, it will be understood that N any positive integer that is greater than or equal to 1. In this regard, it will be understood that the present disclosure is not limited to any specific number of lobes being present in each of the first coil portion 110 and the second coil portion 120.

In some respects, imparting a sinusoidal shape of the first coil portion 110 and the second coil portion 120, and rotating the second coil portion 120 relative to the first coil portion 110 may help increase the sinusoidal response in the receiving signals of the receiving coil 100. Furthermore, causing electric current to run in the clockwise direction in one of the coil portions 110 and 120 and the counterclockwise direction in the other one of the coil portions 110 and 120 may cause the net magnetic flux of the receiving coil 100 (absent any magnetic fields from a target) to be equal to zero thus preventing any direct coupling between the receiving coil 100 and a transmitting coil (e.g., transmitting coil 200 shown in FIG. 2) that is used in conjunction with the receiving coil 100. When the receiving coil 100 is energized, a current may flow in the clockwise direction through one of the coil portions 110 and 120 and in the counterclockwise direction through the other one of the coil portions 110 and 120.

FIG. 2 is a diagram of an example of a transmitting coil 200 that can be used in conjunction with the receiving coil 100. As illustrated, the transmitting coil 200 may have a first coil portion 210 that is coupled to a second coil portion 220. The first coil portion 210 and the second coil portion 220 may each have a substantially circular shape, and they may be centered with each other. The first coil portion 210 may have a radius $R_{in\_2}$, and the second coil portion 220 may have a radius $R_{out\_2}$, wherein $R_{out\_2}$ is greater than $R_{in\_2}$. The first coil portion 210 and the second coil portion 220 may be connected to produce a 180-degree electrical shift. In this regard, when the transmitting coil 200 is energized, current may flow in opposite directions through each of the first coil portion 210 and the second coil portion 220. In FIG. 2, the direction of the current is indicated by the solid black triangles that are superimposed over the depiction of the transmitting coil 200. In some implementations, the transmitting coil 200 may include four turns (e.g., $NT_{tx}=4$), and it may have an inductance that is equal to 2.5 uh (e.g., $L_{tx}=2.5$). However, it will be understood that the present disclosure is not limited to the transmitting coil 200 having any specific number of turns.

FIGS. 3A-B is a diagram of an example of a target 300, according to aspects of the disclosure. The target may be formed of any suitable type of metallic or conductive material, and it may have axes A-A and B-B. Although not shown in FIG. 3, the target may be adapted to be attached to a rotating shaft and/or another suitable type of element for the purpose of monitoring the speed and/or angular displacement of the rotating element. In some implementations, the target 300 may be arranged to rotate about axis A-A. The target 300 may include a main portion 310 that is coupled to a plurality of teeth 320. The main portion 310 and teeth 320 may define a plurality of valleys 330, as shown. Each of the teeth 320 may have an arched outer surface 322, and each of the valleys 330 may also have an arched outer surface 332. Each of the teeth 320 may have an arc length ALT that is equal to 45 degrees. Each of the valleys 330 may also have an arc length $AL_V$ that is equal to 45 degrees. Although in the example of FIGS. 3A-B the target 300 includes a total of four (4) teeth, it will be understood that alternative implementations are possible in which the target 300 includes a different number of teeth (e.g., see FIGS. 5A-B). The target 300 may have an inner radius $R_{in\_3}$ and an outer radius $R_{out\_3}$. The inner radius $R_{in\_3}$ of the target 300 may be the distance from a center C of the target 300 to the outer surface 332 of any of the valleys 330. The outer radius $R_{out\_3}$ of the target may be the distance from the center C of the target 300 to the outer surface 322 of any of the teeth 320.

Figure 4A:
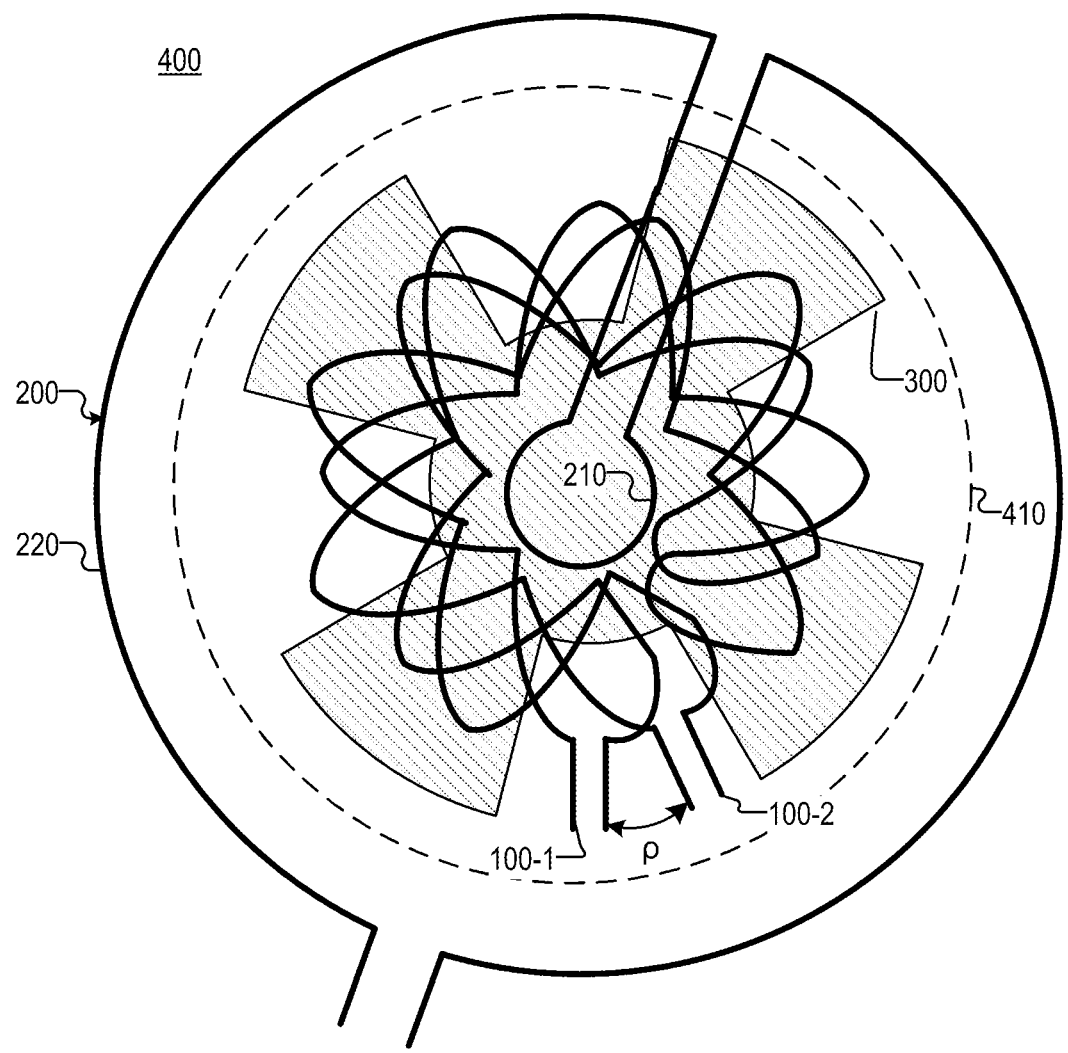
FIG. 4A is a planar top-down view of a system including a sensing element and a target, according to aspects of the disclosure.
Figure 4B:
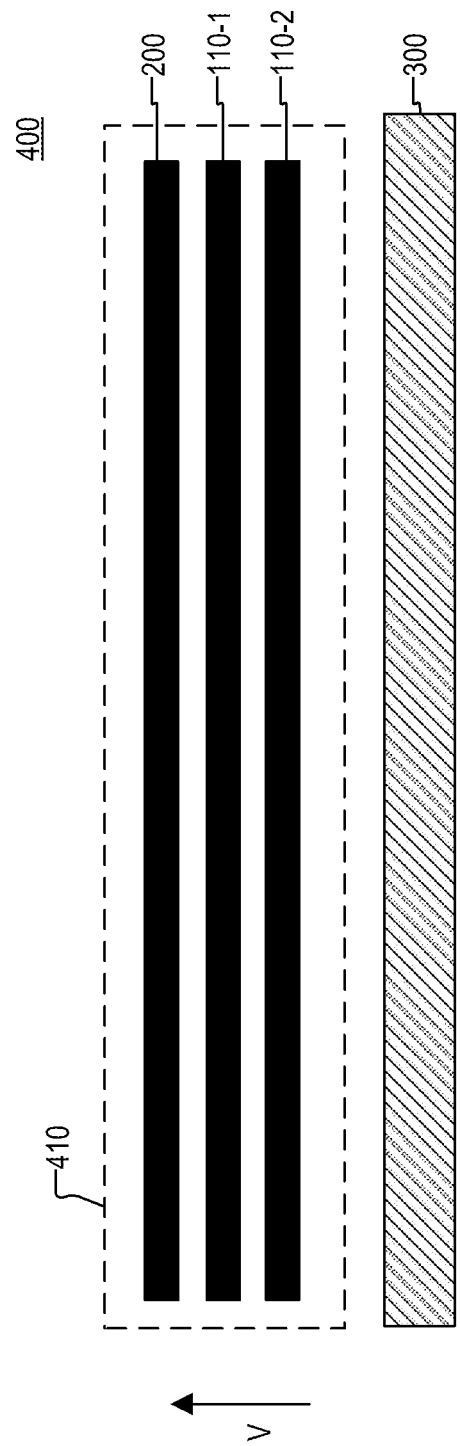
FIG. 4B is a planar side view of the system of FIG. 4A, according to aspects of the disclosure.

FIGS. 4A-B show an example of a system 400, according to aspects of the disclosure. The system 400 includes the target 300 and a sensing element 410 that is disposed adjacent to the target 300. The sensing element 410 may include the transmitting coil 200, a receiving coil 100-1, and a receiving coil 100-2. In some implementations, the receiving coil 100-1 may be the same or similar to the receiving coil 100 (shown in FIG. 1A). As such, the receiving coil 100-1 may include a first coil portion and a second coil portion. The first coil portion of the receiving coil 100-1 may be the same or similar to the coil portion 110 (shown in FIG. 1B), and it may include four (4) lobes. The second coil portion of the receiving coil 100-1 may be the same or similar to the coil portion 120 (shown in FIG. 1C), and it may include four (4) lobes. Additionally or alternatively, in some implementations, the receiving coil 100-2 may be the same or similar to the receiving coil 100 (shown in FIG. 1A). The first coil portion of the receiving coil 100-1 may be the same or similar to the coil portion 110 (shown in FIG. 1B), and it may include four (4) lobes. The second coil portion of the receiving coil 100-1 may be the same or similar to the coil portion 120 (shown in FIG. 1C), and it may include four (4) lobes.

In some implementations, the target 300, the transmitting coil 200, the receiving coil 100-1, and the receiving coil 100-2 may each be centered with one another, and the receiving coil 100-2 may be rotated relative to the receiving coil 100-1 by an angle ρ. According to the example of FIGS. 4A-B, the transmitting coil 200 encircles the receiving coils 100-1 and 100-2 in their outer radius Rout_2, with the same current flowing in one direction externally and in the opposite direction internally, so as to confine the magnetic flux in the area where the receiving coils are. Furthermore, in some implementations, the target 300, the transmitting coil 200, the receiving coil 100-1, and the receiving coil 100-2 may be spaced apart from one another in a vertical direction V and they may be electrically insulated from another.

By way of example, in one possible implementation, the target 300, the transmitting coil 200, the receiving coil 100-1, and the receiving coil 100-2 may be dimensioned as indicated by Table 1 below.

TABLE 1

Dimensions of Elements in System 400

| Transmitting Coil 200 | | |
|---|---|---|
| Outer Radius | $R_{out\_2}$ | 20 mm |
| Inner Radius | $R_{in\_2}$ | 10 mm |
| Number of Turns | $NT_{tx}$ | 4 |
| Inductance | $L_{tx}$ | 2.5 uh |
| Receiving Coils 100-1 | | |
| Outer Radius | $R_{out\_1}$ | 20 mm |
| Inner Radius | $R_{in\_1}$ | 10 min |
| Number of Turns | $NTr_x$ | 1 |
| Lobe Count per Coil Portion | N | 4 |
| Receiving Coil 100-2 | | |
| Outer Radius | $R_{out\_1}$ | 20 mm |
| Inner Radius | $R_{in\_1}$ | 10 mm |
| Number of Turns | $NTr_x$ | 1 |
| Lobe Count per Coil Portion | N | 4 |

TABLE 1-continued

Dimensions of Elements in System 400

| Target 300 | | |
|---|---|---|
| Outer Radius | $R_{out\_3}$ | 22 mm |
| Inner Radius | $R_{in\_3}$ | 10 mm |
| Number of Teeth | N | 4 |
| Tooth Arc Length | $AL_T$ | 45° |
| Valley Arc Length | $AL_V$ | 45° |

According to the example of FIGS. 4A-B, the target of the sensing element 410 has four (4) teeth, the first coil portion of the receiving coil 100-1 may have four (4) lobes, the second coil portion of the receiving coil 100-1 may have four (4) lobes, the first coil portion of the receiving coil 100-2 may have four (4) lobes, and the second coil portion of the receiving coil 100-2 may have four (4) lobes.

According to the example of FIGS. 4A-B, the outer radius $R_{out\_2}$ of the transmitting coil 200 may be greater than or equal to the outer radius $R_{out}$ of any of the receiving coils 100-1 and 100-2. The inner radius $R_{in\_2}$ of the transmitting coil 200 may be less than or equal to the inner radius $R_{in\_1}$ of any of the receiving coils 100-1 and 100-2. Dimensioning the transmitting coil 200 in this manner is advantageous because it causes the transmitted magnetic filed to be uniform in the area (e.g., area of a printed circuit board), where the receiving coils are located.

In some implementations, the number of teeth in the target of the system 400 may be equal to the number of lobes in each coil portion of the receiving coils of the system 400. In general, the magnetic field generated by the eddy current on the target teeth will induce a signal that is dependent on the magnetic flux. Moreover, the magnetic flux through each of the receiving coils 110-1 and 110-2 is dependent on the overlapping between the teeth of the target of the sensing element 410 and the lobes of each of the receiving coils 100-1 and 100-2. As noted above, each receiving coil is composed of a first coil portion (e.g., a clockwise coil portion that is the same or similar to the coil portion 110, discussed above with respect to FIGS. 1A-C) and a second coil portion (e.g., a counterclockwise coil portion that is the same or similar to the coil portion 120, which is discussed above with respect to FIGS. 1A-C). Depending on the position of the teeth of the target, the total flux generated by the eddy current, through any of the coil portions, will be positive, negative or zero. When the teeth of the target are fully overlapping with the lobes of one of the coil portions of a receiving coil (e.g., of any of the receiving coils 110-1 and 110-2) and the valleys are completely overlapping with the lobes of the other coil portion of the receiving coil, the flux and the received signal will be at a maximum (either positive or negative). When the teeth are in an intermediate position, and overlap with the lobes of both coil portions, the signal may be zero or somewhere between zero and the maximum value. In this regard, matching the number teeth in the target to the number of lobes that are available in each coil portion of the receiving coils 110-a and 110-2 is advantageous because it ensures that in each rotation of the target there will be instances in which: (i) the teeth of the target overlap fully with the lobes of one coil portion of any of the receiving coils 110-1 and 110-2, and (ii) the valleys of the target overlap fully with the other coil portion of the same receiving coil.

The sensing element 410 may be used to measure the rotational displacement and/or speed of the target 300. In some implementations, the sensing element 410 may be part of a sensor 600, which is discussed further below with respect to FIG. 6.

Figure 5A:
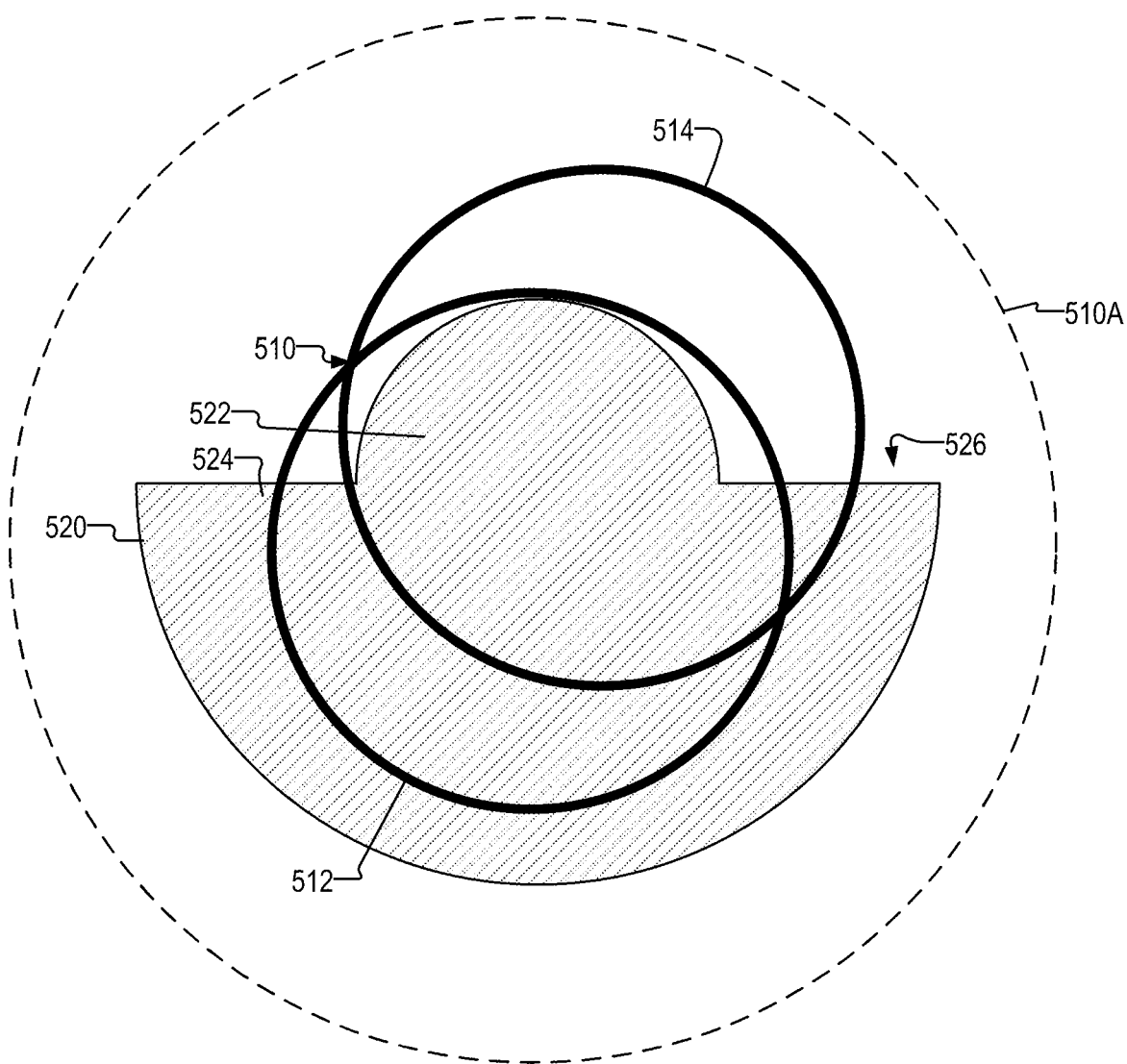
FIG. 5A is a diagram of a system that includes another example of a receiving coil, according to aspects of the disclosure.

FIG. 5A is a schematic diagram of another possible implementation of the sensing element 410 of FIG. 4A. As illustrated, in the example of FIG. 5A, the sensing element 410 includes a receiving coil 510 that is used to measure the speed (and/or angular displacement) of a target 520. The receiving coil 510 may include a first coil portion 512 and a second coil portion 514. The first coil portion 512 and the second coil portion 514 may include 1 lobe each. The shape of the first coil portion 512 may be defined, at least in part, by Equation 1, with the value of N being set to one (1). The shape of the second coil portion 514 may be defined, at least in part, by Equation 2, with the value of N being set to one (1). The target 520 may have a main portion 522, a tooth 524, and a valley 526. As illustrated, the tooth 524 and the valley 526 may each have a respective arc length that is equal to 180 degrees. For illustrative purposes, FIG. 5A depicts the sensing element 410 as having one receiving coil only. However, it will be understood that the sensing element 410 may include a second receiving coil that is the same as the receiving coil 510, as well as a transmitting coil.

Figure 5B:
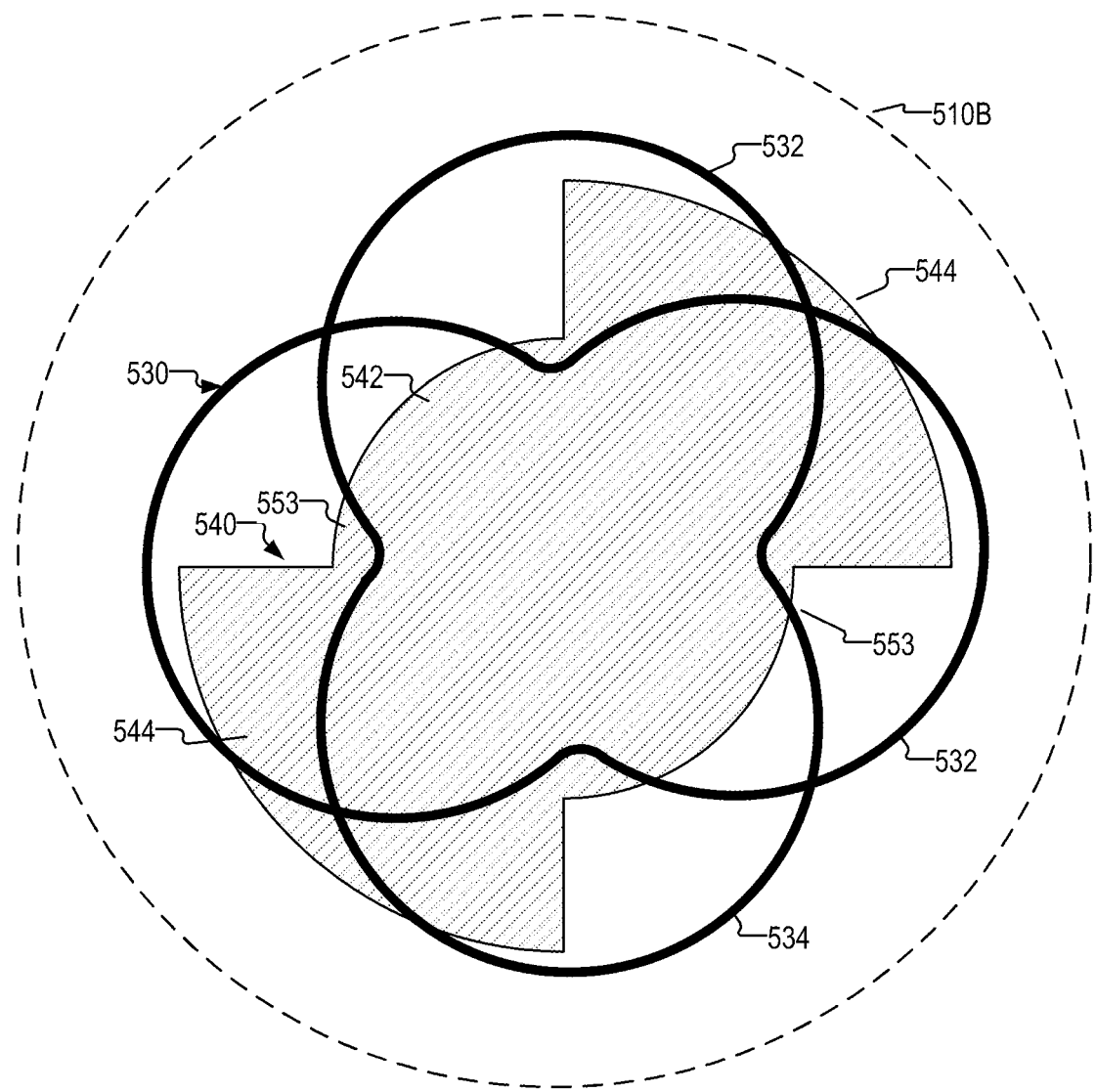
FIG. 5B is a diagram of a system that includes yet another example of a receiving coil, according to aspects of the disclosure.

FIG. 5B is a schematic diagram of yet another possible implementation of the sensing element 410. As illustrated, in the example of FIG. 5B, the sensing element 410 includes a receiving coil 530 that is used to measure the speed (and/or angular displacement) of a target 540. The receiving coil 530 may include a first coil portion 532 and a second coil portion 534. The first coil portion 532 and the second coil portion 534 may include 2 lobes each. The shape of the first coil portion 532 may be defined, at least in part, by Equation 1, with the value of N being set to two (2). The shape of the second coil portion 534 may be defined, at least in part, by Equation 2, with the value of N being set to two (2). The target 540 may have a main portion 542, teeth 544, and valleys 553. As illustrated, the teeth 544 and the valleys 553 may each have a respective arc length that is equal to 90 degrees. For illustrative purposes, FIG. 5B depicts the sensing element 410 as having one receiving coil only. However, it will be understood that the sensing element 410 may include a second receiving coil that is the same as the receiving coil 530, as well as a transmitting coil.

Figure 6:
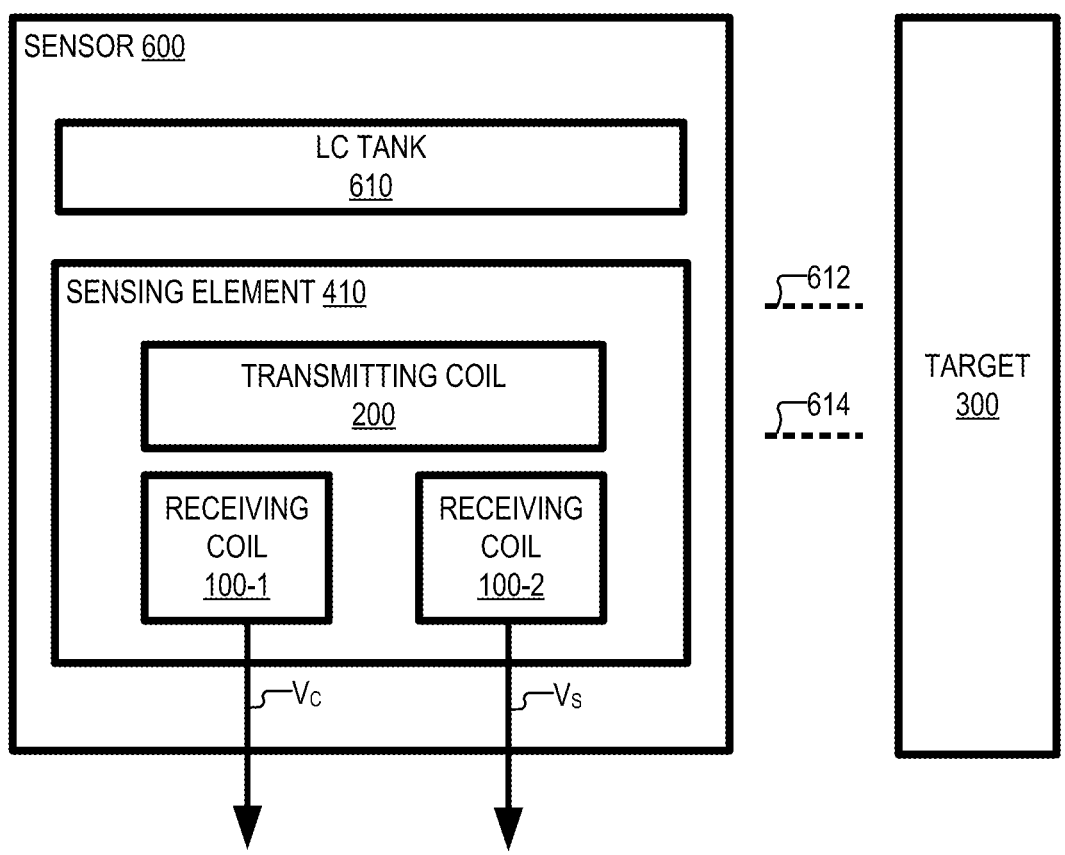
FIG. 6 is a diagram of an example of a sensor, according to aspects of the disclosure.

FIG. 6 shows an example of a sensor 600 that includes the sensing element 410 (shown in FIGS. 4A-B). According to the present example, the sensor 600 is a rotary inductive sensor. However, it will be understood that the present disclosure is not limited to any specific implementation of the sensor 600. As illustrated, the sensor 600 may also include an LC tank 610 that is configured to drive the transmitting coil 200. Although in the example of FIG. 6, the transmitting coil 200 and the LC tank 610 are depicted as separate blocks, it will be understood that the transmitting coil can itself constitute the inductance of the LC tank. In some respects, the transmitting coil 200 may itself constitute the inductance of the LC tank. In operation, the LC tank 610 may cause the transmitting coil 200 to transmit a direct magnetic field 612. The direct magnetic field 612 may induce a second magnetic field 614 (hereinafter "reflected magnetic field 614") in the target 120. The receiving coils 100-1 and 100-2 may receive the reflected magnetic field 614 and output signals Vc and Vs, respectively. The signals Vc and Vs may be described by Equations 3 and 4 below:

$$V_c = K_1 \cos(\theta_{el}) * \sin(2\pi f_r t) \quad (3)$$

$$V_s = K_2 \sin(\theta_{el}) * \sin(2\pi f_r t) \quad (4)$$

where, $K_1$ is a coupling coefficient associated with the receiving coil 100-1, $K_2$, is a coupling coefficient of the receiving coil 100-2, $\theta_{el}$ is the electrical angle of the target 300 in the target's electrical period, $f_r$ is the resonant frequency of the LC tank 610, and t is time. According to the present disclosure, the electrical angle of the target 300 indicates the angular position of the target 300 in its electrical period. The coupling coefficient $K_1$ indicates the proportion of the flux of the reflected magnetic field 614, which is sensed by the receiving coil 100-1. And the coupling coefficient $K_2$ indicates the proportion of the magnetic flux of the reflected magnetic field 614 that is sensed by the receiving coil 100-2. In other words, the coupling coefficients may indicate the proportion of energy transmitted by the target 300 that is received by the receiving coil 100-1 and 100-2, respectively.

As is discussed further below, the signal $V_c$ can be demodulated to produce a signal $V_{c\_demod}$, and the signal $V_s$ can be demodulated to produce a signal $V_{s\_demod}$. Signals $V_{s\_demod}$ and $V_{c\_demod}$ may be described by Equations 5 and 6:

$$V_{c\_demod} = \cos(\theta_{el}) \quad (5)$$

$$V_{s\_demod} = \sin(\theta_{el}) \quad (6)$$

The electrical angle of the target 300 may be based on the mechanical angle of the target 300 (with respect to the sensor 600) and the number of lobes in each portion of the receiving coils 100-1 and 100-2. The relationship between the electrical angle of the target 300 and the mechanical angle of the target 300 can be described by Equation 7 below:

$$\theta_{el} = N * \theta_{mech} \quad (7)$$

where N is the number of turns in each coil portion of the receiving coils 100-1 and 100-2 and $\theta_{mech}$ is the mechanical angle of the target 300. According to the present disclosure, the mechanical angle of the target 300 indicates the orientation of the axis B-B of the target 300 relative to the sensor 600 and/or the sensing element 400. According to the example of FIG. 6, each coil portion of the receiving coils 100-1 and 100-2 includes four (4) lobes (e.g., see FIGS. 1A-E). However, alternative implementations are possible in which the coil portions of each of the receiving coils 100-1 and 100-2 include a different number of lobes (e.g., see FIGS. 5A-B.)

Figure 7A:
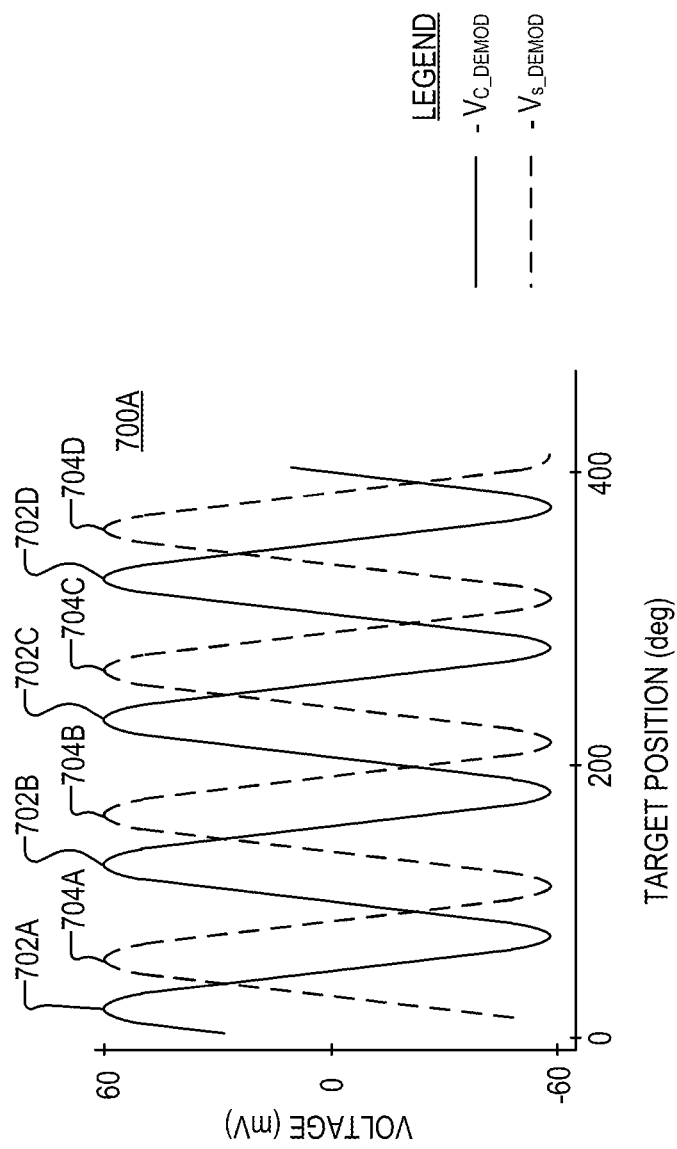
FIG. 7A is a plot of signals that can be generated by using the sensor of FIG. 6, according to aspects of the disclosure.

FIG. 7A shows a plot 700A illustrating the behavior of signals $V_{c\_demod}$ and $V_{s\_demod}$ under ideal circumstances. According to the example of FIG. 7A, the signals $V_{c\_demod}$ and $V_{s\_demod}$ are 90 degrees apart. As illustrated, the signal $V_{c\_demod}$ may include a plurality of peaks 702, and the signal $V_{s\_demod}$ may include a plurality of peaks 704. Each of the peaks 702 and 704 may correspond to a different mechanical angle of the target 300. For example, peaks 702a and 704a may correspond to a mechanical angle of the target 300 that is equal to 90°, peaks 702b and 704b may correspond to a mechanical angle of the target 300 that is equal to 180°, peaks 702c and 704c may correspond to a mechanical angle of the target 300 that is equal to 270°, and peaks 702d and 704d may correspond to a mechanical angle of the target 300 that is equal to 360°. FIG. 7A is provided to illustrate that under ideal circumstances: (i) the amplitude of each of the peaks 702 would be the same, and (ii) the amplitude of each of the peaks 704 would also be the same.

FIG. 7B shows a plot 700B illustrating the behavior of signals $V_{c\_demod}$ and $V_{s\_demod}$ under most practical circumstances. According to the example of FIG. 7A, the signals $V_{c\_demod}$ and $V_{s\_demod}$ are 90 degrees apart. As illustrated, the signal $V_{c\_demod}$ may include a plurality of peaks 702, and the signal $V_{s\_demod}$ may include a plurality of peaks 704. In the example of FIG. 7B, peak 702b has a higher amplitude than each of peaks 702a, 702b, and 702d. The difference in amplitude between peak 702b and peaks 702a, 704c, and 704d may be attributable to minor misalignment (and/or other imperfections) in the mechanical installation of the sensor 600 and/or target 300. As is discussed further below, the tendency of the signal $V_{c\_demod}$ to have peaks of varying amplitude may be utilized to generate a reference pulse, which is subsequently used to calculate the mechanical angle of the target 300 based on the signals $V_{c\_demod}$ and $V_{s\_demod}$ (e.g., see FIGS. 8-10). FIG. 7B is provided to illustrate that under most practical circumstances: (i) the amplitude of at least one of the peaks 702 may differ from the amplitude of another one of the peaks 702, and/or (ii) the amplitude of at least one of the peaks 704 may differ from the amplitude of another one of the peaks 704.

Although in the example of FIG. 7B the amplitude of the peaks in the signal $V_{c\_demod}$ varies, it will be understood that the peaks in the signal Vs may also have different amplitudes. According to the example of FIGS. 7A-B, each set of peaks 702A-D and 704A-D corresponds to one full rotation of the target 300, and it represents one full cycle in the signals $V_{c\_demod}$ and $V_{s\_demod}$. This cycle may be repeated with each rotation of the target 300.

Figure 8A:
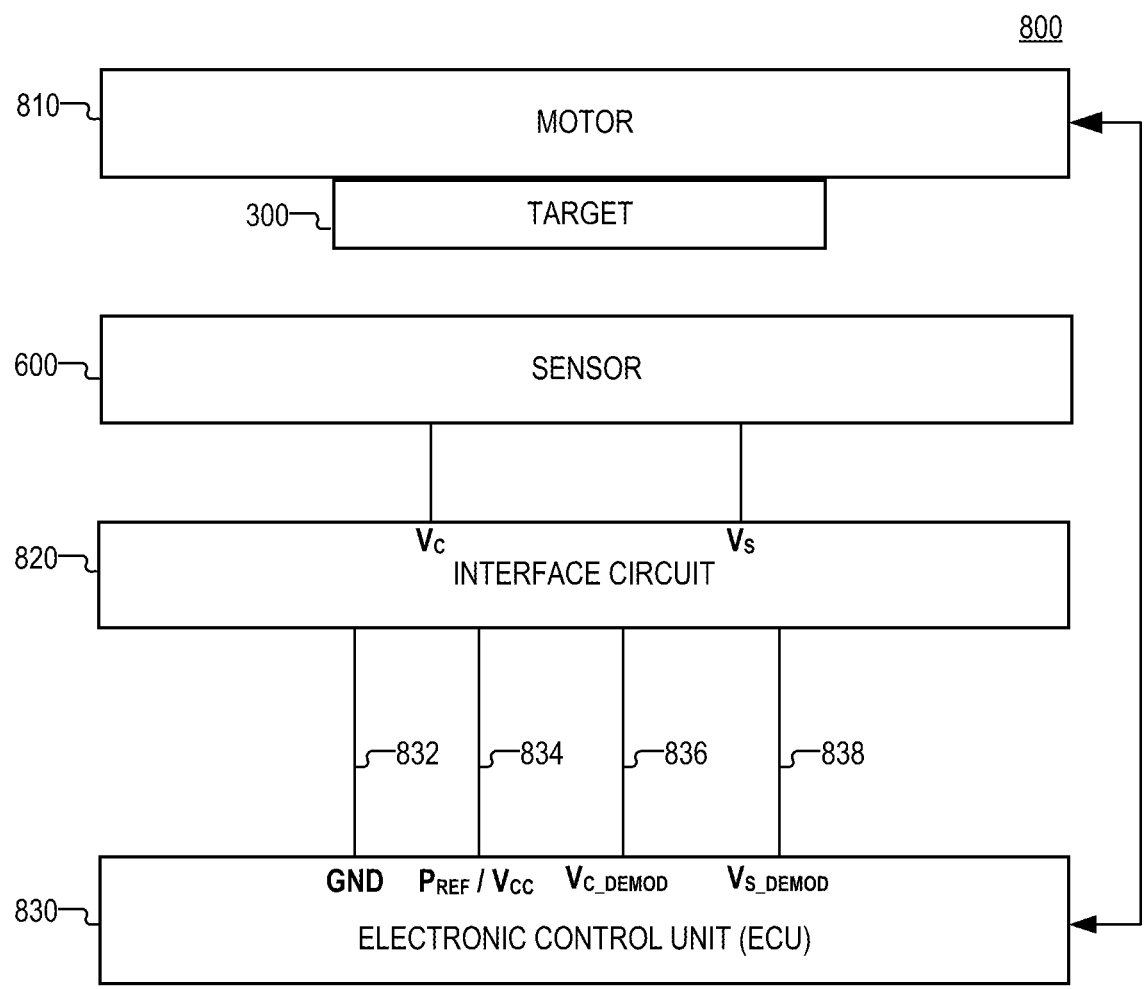
FIG. 8A is a diagram of an example of a system that includes the sensor of FIG. 6, according to aspects of the disclosure.

FIG. 8A is a diagram of an example of a system 800, according to aspects of the disclosure. As illustrated, the system 800 may include an electric motor 810, the target 300, the sensor 600, an interface circuit 820, and an electronic control unit (ECU) 830. The target 300 may be coupled to a rotor of the electric motor 810 (not shown), and it may rotate with the rotor. The sensor 600 may detect the rotation of the target 300 (as discussed above with respect to FIG. 6) and output signals $V_c$ and $V_s$ to the interface circuit 820. The interface circuit 820 may demodulate the signals $V_c$ and $V_s$ to produce the signals $V_{c\_demod}$ and $V_{s\_demod}$ (e.g., see FIG. 7B). The interface circuit 820 may be coupled to the ECU 830 via lines 832-838. Line 832 may be used by the ECU 830 to provide ground to the interface circuit 820. Line 834 may be used by the ECU 830 to provide power to the interface circuit. Line 836 may be used by the interface circuit 820 to provide the signal $V_{c\_demod}$ to the ECU 830. And line 838 may be used by the interface circuit 820 to provide the signal $V_{s\_demod}$ to the ECU 830. Based on the signals $V_{c\_demod}$ and $V_{s\_demod}$, the ECU 830 may determine the electric angle $\theta_{el}$ of the target 300, in accordance with Equation 8 below.

$$\theta_{el} = \arctan\left(\frac{V_s demod}{V_c demod}\right) \quad (8)$$

Additionally or alternatively, in some implementations, the interface circuit 820 may calculate internally the angle $\theta_{el}$ and reconstruct the signals to be sent in output, (i.e., $V_{c\_demod}$ and $V_{s\_demod}$) from this calculated angle. In this regard, the interface circuit 820 may generate a constant signal amplitude based on the different peaks of the signals $V_c$ and $V_s$, thus losing the amplitude variation of different peaks in input, and transmitting a reference position through a pulse. The interface circuit may also shift the demodulated signals by adding or subtracting a programmable reference angle.

The electrical angle $\theta_{el}$ of the target 300 may be used by the ECU 830 to determine the speed and/or mechanical angle of the target 300. Based on the speed and/or mechanical angle of the target 300, the ECU 830 may adjust the speed of (or stop) the electric motor 810. It will be understood that the present disclosure is not limited to any specific method for using the speed and/or mechanical angle of the target 300. Although in the example of FIG. 8 the sensor 600 is used to control the speed of an electric motor, it will be understood that the present disclosure is not limited to any specific application of the sensor 600. For example, the sensor 600 can be used to control shifting in automotive transmissions and/or any other suitable application. In this regard, although in the example of FIG. 8 the interface circuit 820 is coupled to an ECU, it will be understood that alternative implementations are possible in which the interface circuit 820 is coupled to another type of electronic circuitry.

The interface circuit 820 may be configured to generate a reference pulse. The reference pulse may be generated based on the signal $V_{c\_demod}$. The signal $V_{c\_demod}$ may include N peaks in each full rotation (i.e., 360° rotation) of the target 300, wherein N is the number of lobes in each coil portion of the receiving coils 100-1 and 100-2. In each set of N peaks, that are generated during a given full rotation of the target 300, one of the peaks would have a higher amplitude than the rest (e.g., peak 702B, which is shown in FIG. 7B). For ease of description, this peak is herein referred to as "the reference peak of the signal $V_c$." As is discussed further below, in some implementations, the interface circuit 820 outputs a reference pulse, every time the reference peak of the signal $V_{c\_demod}$ is detected.

Figure 8B:
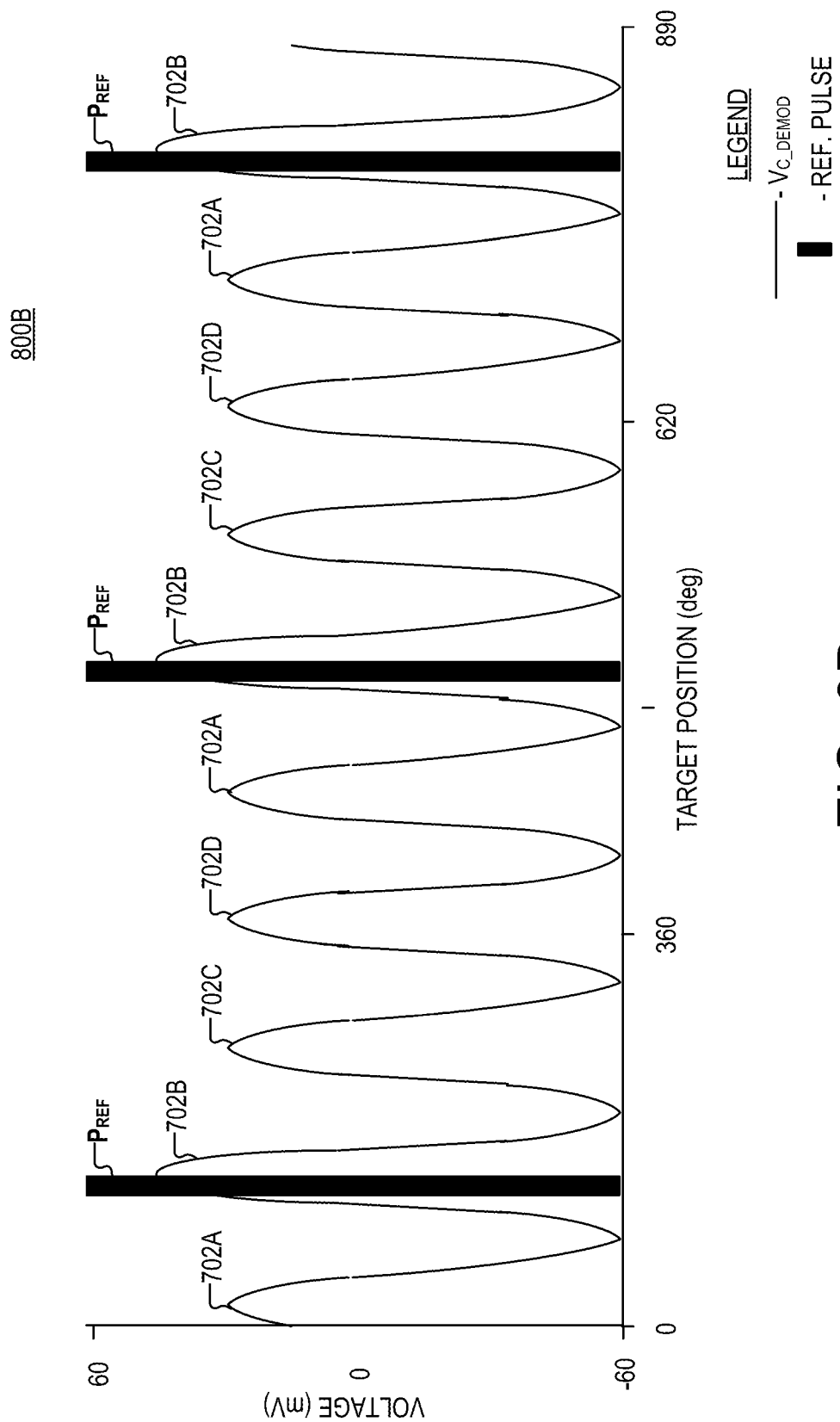
FIG. 8B is a plot showing an example of a reference pulse that is generated by an interface circuit that is part of the system of FIG. 8A, according to aspects of the disclosure.

FIG. 8B shows a plot of a reference pulse $P_{ref}$ that is generated by the interface circuit 820 based on the signal $V_{c\_demod}$. In some implementations, each reference pulse $P_{ref}$ may be cotemporaneous with a different one of the reference peaks 702b in the signal $V_{c\_demod}$. In this regard, each reference pulse $P_{ref}$ may be generated by the interface circuit 820 at the same time (or roughly the same time) with the occurrence of the reference peaks 702b in the signal $V_{c\_demod}$.

The interface circuit 820 may provide each reference pulse $P_{ref}$ to the ECU 830. In some implementations, the interface circuit 820 may output each reference pulse $P_{ref}$ over line 834, which is also used by the interface circuit 820 to receive power from the ECU 830. In some respects, outputting each reference pulse $P_{ref}$ over the line 834 is advantageous because it permits the use of the same wiring harnesses (or other wiring interfaces) that are used by older-generation interface circuits. In other words, outputting the pulses $P_{ref}$ over the line 834 allows for backward compatibility between the wiring interface (and/or wiring harness) of the interface circuit 820 and the wiring interfaces of electronic circuitry that is used in conjunction with older-generation interface circuits, which lack the capability of generating a reference pulse.

In some implementations, each reference pulse $P_{ref}$ may have an amplitude of 10 mA and a width of 10 us. However, it will be understood that the present disclosure is not limited to any specific amplitude or width for the reference pulses $P_{ref}$. For example, in some implementations, the width and/or amplitude of each reference pulse $P_{ref}$ may be programmable. Furthermore, in high-speed applications, each reference pulse $P_{ref}$ can be replaced by a signal pattern (e.g., a sine or a sawtooth pattern) that is transmitted over one full revolution of the target 300. As can be readily appreciated, the signal pattern may be transmitted once in each set of M consecutive revolutions of the target 300, where M is an integer greater than 1.

The ECU 830 may use the pulse $P_{ref}$ to determine the mechanical angle $\theta_{mech}$ of the target 300. As noted above, rotary inductive sensors (such as the sensor 600) may generate several sine/cosine periods per revolution of a target, and they may not allow detecting absolute angle position. One full rotation can be identified by counting the number of sine/cosine periods, but depending on the starting position of the target, the revolution start and end will be different, which makes it difficult to find a reliable reference point for counting the number of sine/cosine periods. Using the reference pulses $P_{ref}$ to determine the mechanical angle $\theta_{mech}$ of the target 300 is advantageous because the reference pulses $P_{ref}$ can establish a clear reference point for counting the sine/cosine periods in each revolution of the target 300, thereby preventing errors in the electrical angle information from affecting the final calculation of the mechanical angle $\theta_{mech}$.

More particularly, the ECU 830 may determine the mechanical angle $\theta_{mech}$ of the target 300 in accordance with Equation 9 below:

$$\theta_{mech} = \frac{\theta_{el}}{N} + k\left(\frac{360}{N}\right) \quad (9)$$

where N is the number of lobes in each of the coil portions of receiving coils 100-1 and 100-2, and k is the number of peaks since the generation of the last pulse $P_{ref}$. According to the example of FIG. 8B, the value of k for each peak 702A is 3; the value of k for each peak 702B is 0, the value of k for each peak 702C is 1, and the value of k for each peak 702D is 2. As noted above, the ECU 830 may adjust the speed of (or stop) the electric motor 810 based on the value of the mechanical angle $\theta_{mech}$.

Figure 9:
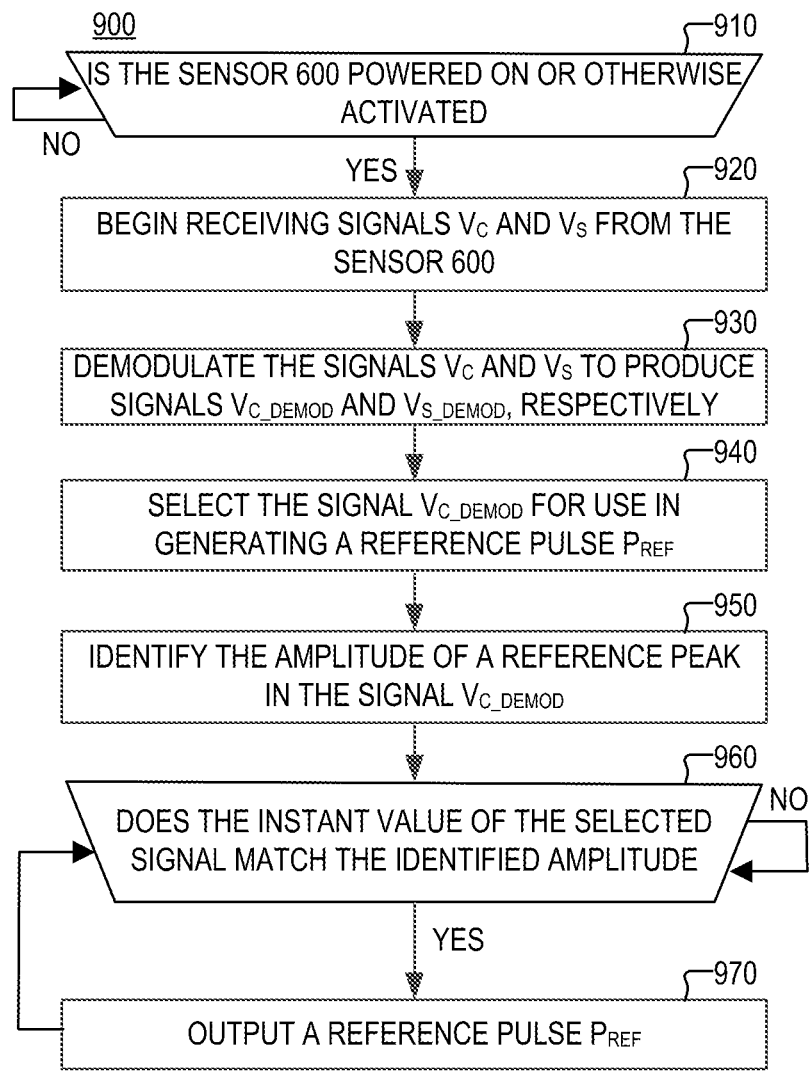
FIG. 9. is a flowchart of an example of a process that is performed by the interface circuit of FIG. 8B, according to aspects of the disclosure.

FIG. 9 is a flowchart of a process 900, according to aspects of the disclosure. At step 910, the interface circuit 820 detects whether the sensor 600 is powered on or otherwise activated. If the sensor 600 is powered on, the process 900 proceeds to step 920. Otherwise, if the sensor 600 is powered off, step 910 is repeated again. At step 920, the interface circuit 820 begins receiving the signals $V_c$ and $V_s$ from the sensor 600. At step 930, the interface circuit 820 demodulates the signals $V_c$ and $V_s$ to produce the signals $V_{c\_demod}$ and $V_{s\_demod}$, respectively. At step 940, the interface circuit selects the signal $V_{c\_demod}$ for use in generating the reference pulse $P_{ref}$. At step 950, the interface circuit identifies the amplitude of a reference peak that occurs in the signal $V_{c\_demod}$. At step 960, the interface circuit detects whether the instant value of the signal $V_{c\_demod}$ matches the amplitude of the reference peak (identified at step 950). If the instant value of the selected signal matches the amplitude (identified at step 950), the process 900 proceeds to step 970. Otherwise, if the instant value of the selected signal does not match the amplitude (identified at step 950), step 960 is repeated again. At step 970, the interface circuit 820 outputs the reference pulse $P_{ref}$.

According to the present example, the interface circuit 820 determines (at step 940) the amplitude of a reference peak of the selected signal. As noted above, in some implementations, the reference peak of the selected signal may be the peak having the highest amplitude among all peaks that occur in the selected signal during a particular (full) revolution of the target 300. Although in the present example the reference peak is a positive peak, alternative implementations are possible in which the reference peak is a negative peak (or another type of peak). In such implementations, the reference peak may have the lowest amplitude among all negative peaks that are generated during a particular (full) revolution of the target. In some implementations, the instant value of the signal $V_{c\_demod}$ may match the amplitude of the reference peak (identified at step 950) when the instant value is equal to the amplitude or within a predetermined distance from the amplitude.

According to the present example, the process 900 is executed in the digital domain. In this regard, it will be understood that the process 900 may be performed by processing circuitry that is part of the interface circuit 820. The processing circuitry may include a general-purpose processor, a special-purpose processor, an Application-Specific Integrated Circuit (ASIC), a Field-Programmable Gate Array, and/or any other suitable type of processing circuitry. Furthermore, it will be understood that in some implementations, the process 900 may be performed in the analog domain, by using analog circuitry. In this regard, it will be understood that the present disclosure is not limited to any specific implementation of the interface circuit 820.

FIG. 10 is a state diagram illustrating aspects of the operation of the interface circuit 820, in accordance with one particular implementation. As illustrated, the interface circuit 820 may be in one of three operational states over the course of its operation. The operational states may include an inactive state 1010, a calibration state 1020, and an active state 1030. When the interface circuit 820 is in the inactive state 1010, the interface circuit 820 may be powered off or otherwise not being used. When the interface circuit 820 is in the calibration state, the interface circuit 820 may execute a routine for identifying the amplitude of a predetermined type of peak in a signal that is output from one of the receiving coils 100-1 and 100-2 (see FIGS. 6 and 8). In some implementations, the interface circuit 820 may execute steps 920-950 of the process 900 when the interface circuit 820 is in the calibration state 1020. When the interface circuit 820 is in the active state, the interface circuit 820 may be generating the reference pulses $P_{ref}$, which are discussed above with respect to FIGS. 7A-9.

In some implementations, when the interface circuit 820 is in the active state 1030, the interface circuit 820 may execute steps 960 and 970 of the process 900. Under the nomenclature of the present disclosure, the sensor 600 may be considered to be activated, when the electric motor 810 starts turning, when the interface circuit 820 is powered on, and/or when any other suitable type of event is detected. As can be readily appreciated, the interface circuit 820 may transition from the inactive state 1010 to the calibration state 1020 when the sensor 600 is powered on or otherwise activated. The interface circuit 820 may transition from the calibration state 1020 to the active state 1030 after the interface circuit 820 has identified the amplitude of a reference peak in a signal of interest. The calibration circuit may transition from the active state 1030 back into the inactive state 1010 when the interface circuit 820 is powered off.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high-level procedural or object-oriented programming language to work with the rest of the computer-based system.

However, the programs may be implemented in assembly, machine language, or Hardware Description Language. The language may be a compiled or an interpreted language, and it may be deployed in any form, including as a stand-alone program or as a module, component, subroutine, or another unit suitable for use in a computing environment. A computer program may be deployed to be executed on one computer or multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

The invention claimed is:

1. An apparatus, comprising:
   a transmitting coil;
   a first receiving coil having a first receiving coil portion and a second receiving coil portion, the first receiving coil portion and the second receiving coil portion being coupled to one another, and the first receiving coil portion and the second receiving coil portion each including N lobes, where N is an integer and N≥1;
   a second receiving coil having a third receiving coil portion and a fourth receiving coil portion, the third receiving coil portion and the fourth receiving coil portion being coupled to one another, and the third receiving coil portion and the fourth receiving coil portion each including N lobes;
   wherein the first receiving coil is disposed over the second receiving coil,
   wherein the transmitting coil is disposed over at least one of the first receiving coil and the second receiving coil, and the transmitting coil has an inner radius that is smaller than an outer radius of the first receiving coil; and
   wherein, the first receiving coil portion and the third receiving coil portion are arranged to conduct electric current in a first direction, and the second receiving coil portion and the fourth receiving coil portion are arranged to conduct electric current in a second direction that is opposite to the first direction,
   wherein the second receiving coil is rotated relative to the first receiving coil.

2. The apparatus of claim 1, wherein:
   the first receiving coil has a first end and a second end; and
   the first receiving coil has a curved shape, such that the first end and the second end are disposed adjacent to each other, while being electrically insulated from one another.

3. The apparatus of claim 1, wherein the transmitting coil is arranged to emit a first magnetic field towards a target, wherein the first receiving coil and the second receiving coil are arranged to detect a second magnetic field that is emitted by the target in response to the first magnetic field.

4. The apparatus of claim 1, wherein the first receiving coil and the second receiving coil have substantially the same shape.

5. The apparatus of claim 1, wherein the second receiving coil portion has a shape that is at least in part defined by the equation of:

$$R_2(\theta) = R_{in} + \left(\frac{R_{out} - R_{in}}{2}\right)(1 + \cos(N*\theta) + \phi)$$

where $R_2(\theta)$ is a respective polar coordinate of any point in the second receiving coil portion, and $\phi$ is a rotational offset of the first receiving coil portion relative to the second receiving coil portion.

6. The apparatus of claim 1, further comprising a target having N teeth and N valleys, the target being disposed adjacent to the first receiving coil and the second receiving coil.

7. The apparatus of claim 1, wherein each of the first receiving coil and the second receiving coil is responsive to a target having N teeth and N valleys.

8. An apparatus, comprising:
   a transmitting coil;
   a first receiving coil having a first receiving coil portion and a second receiving coil portion, the first receiving coil portion and the second receiving coil portion being coupled to one another, and the first receiving coil portion and the second receiving coil portion each including N lobes, where N is an integer and N≥1;
   a second receiving coil having a third receiving coil portion and a fourth receiving coil portion, the third receiving coil portion and the fourth receiving coil portion being coupled to one another, and the third receiving coil portion and the fourth receiving coil portion each including N lobes;
   wherein the first receiving coil is disposed over the second receiving coil,
   wherein the transmitting coil is disposed over at least one of the first receiving coil and the second receiving coil, and the transmitting coil has an inner radius that is smaller than an outer radius of the first receiving coil; and
   wherein, the first receiving coil portion and the third receiving coil portion are arranged to conduct electric current in a first direction, and the second receiving coil portion and the fourth receiving coil portion are arranged to conduct electric current in a second direction that is opposite to the first direction,
   wherein the second receiving coil portion is rotated relative to the first receiving coil portion, and the fourth receiving coil portion is rotated relative to the third receiving coil portion.

9. An apparatus, comprising:
   a transmitting coil;
   a first receiving coil having a first receiving coil portion and a second receiving coil portion, the first receiving coil portion and the second receiving coil portion being coupled to one another, and the first receiving coil portion and the second receiving coil portion each including N lobes, where N is an integer and N≥1;

a second receiving coil having a third receiving coil portion and a fourth receiving coil portion, the third receiving coil portion and the fourth receiving coil portion being coupled to one another, and the third receiving coil portion and the fourth receiving coil portion each including N lobes;

wherein the first receiving coil is disposed over the second receiving coil, wherein the transmitting coil is disposed over at least one of the first receiving coil and the second receiving coil, and the transmitting coil has an inner radius that is smaller than an outer radius of the first receiving coil; and wherein, the first receiving coil portion and the third receiving coil portion are arranged to conduct electric current in a first direction, and the second receiving coil portion and the fourth receiving coil portion are arranged to conduct electric current in a second direction that is opposite to the first direction, wherein the first receiving coil portion has a shape that is at least in part defined by the equation of:

$$R_1(\theta) = R_{in} + \left(\frac{R_{out} - R_{in}}{2}\right)(1 + \cos(N*\theta))$$

where $R_1(\theta)$ is a respective polar coordinate of any point in the first receiving coil portion, $R_{in}$ is an inner radius of the first receiving coil, and $R_{out}$ is the outer radius of the first receiving coil.

10. A system comprising:
a transmitting coil;
a target having N teeth and N valleys, where N is an integer and N≥1;
a first receiving coil having a first receiving coil portion and a second receiving coil portion, the first receiving coil portion and the second receiving coil portion being coupled to one another, and the first receiving coil portion and the second receiving coil portion each including N lobes;
a second receiving coil that is disposed over the first receiving coil, the second receiving coil having a third coil portion and a fourth coil portion, the third coil portion and the fourth coil portion being coupled to one another, and the third coil portion and the fourth coil portion each including N lobes; and
wherein the transmitting coil is arranged to emit a first magnetic field towards the target and the transmitting coil has an inner radius that is smaller than an outer radius of the first receiving coil, wherein the first receiving coil and the second receiving coil are arranged to sense a second magnetic field that is emitted by the target in response to the first magnetic field, wherein the first receiving coil portion has a shape that is at least in part defined by the equation of:

$$R_1(\theta) = R_{in} + \left(\frac{R_{out} - R_{in}}{2}\right)(1 + \cos(N*\theta))$$

where $R_1(\theta)$ is a respective polar coordinate of any point in the first receiving coil portion, $R_{in}$ is an inner radius of the first receiving coil, and $R_{out}$ is the outer radius of the first receiving coil, and wherein the second receiving coil portion has a shape that is at least in part defined by the equation of:

$$R_2(\theta) = R_{in} + \left(\frac{R_{out} - R_{in}}{2}\right)(1 + \cos(N*\theta) + \phi)$$

where $R_2(\theta)$ is a respective polar coordinate of any point in the second receiving coil portion, and $\phi$ is a rotational offset of the first receiving coil portion relative to the second receiving coil portion.

11. The system of claim 10, wherein the first receiving coil portion and the second receiving coil portion are arranged to conduct electric current in a first direction, and the second receiving coil portion and the fourth coil portion are arranged to conduct electric current in a second direction that is opposite to the first direction.

12. The system of claim 10, wherein the first receiving coil and the second receiving coil are centered with one another.

13. The system of claim 10, wherein the first receiving coil and the second receiving coil have substantially the same shape.

14. The system of claim 10, wherein:
the first receiving coil has a first end and a second end;
the first receiving coil has a curved shape, such that the first end and the second end are disposed adjacent to each other, while being electrically insulated from one another.

15. The system of claim 10, wherein the transmitting coil is disposed over at least one of the first receiving coil and the second receiving coil.

16. The system of claim 10, wherein the transmitting coil has an outer radius that is greater than a sum of an inner radius and an outer radius of the first receiving coil.

* * * * *

UNITED STATES PATENT AND TRADEMARK OFFICE
CERTIFICATE OF CORRECTION

PATENT NO. : 11,326,903 B1
APPLICATION NO. : 17/097498
DATED : May 10, 2022
INVENTOR(S) : Emanuele Andrea Casu et al.

It is certified that error appears in the above-identified patent and that said Letters Patent is hereby corrected as shown below:

In the Specification

Column 3, Line 54 delete "first coil" and replace with --second coil--.

Column 3, Line 58 delete "portion." and replace with --portion 120.--.

Column 4, Line 3 delete "N any" and replace with --N is any--.

Column 4, Line 60 delete "surface 332." and replace with --surface 322.--.

Column 5, Line 24 delete "100-1" and replace with --100-2--.

Column 5, Line 27 delete "100-1" and replace with --100-2--.

Column 5, Table 1 delete "10 min" and replace with --10 mm--.

Column 6, Line 26 delete "filed" and replace with --field--.

Column 6, Line 59 delete "110-a" and replace with --110-1--.

Column 7, Line 54 delete "coil can" and replace with --coil 200 can--.

Column 7, Line 56 delete "tank." and replace with --tank 610.--.

Column 7, Line 60 delete "target 120." and replace with --target 300.--.

Column 8, Line 15 delete "coil" and replace with --coils--.

Column 8, Line 40 delete "element 400." and replace with --element 410.--.

Signed and Sealed this
Twenty-fifth Day of July, 2023

Katherine Kelly Vidal
*Director of the United States Patent and Trademark Office*

Column 9, Line 5 delete ", 702b," and replace with --, 702c,--.

Column 9, Line 44 delete "circuit," and replace with --circuit 820.--.

Column 9, Line 65 delete "circuit may" and replace with --circuit 820 may--.

Column 10, Line 59 delete "10 us." and replace with --10 µs--.

Column 11, Line 49 delete "circuit selects" and replace with --circuit 820 selects--.

Column 11, Line 50 delete "circuit" and replace with --circuit 820--.

Column 12, Line 33 delete "state," and replace with --state 1020,--.

Column 12, Line 40 delete "state," and replace with --state 1030,--.

Column 12, Line 56 delete "calibration circuit may" and replace with --interface circuit 820 may--.